United States Patent
Wiethoff et al.

(10) Patent No.: US 11,165,303 B2
(45) Date of Patent: Nov. 2, 2021

(54) GUIDE RING FOR CONNECTION TO A HOUSING OF AN ELECTRIC MACHINE

(71) Applicant: CPT Group GmbH, Hannover (DE)

(72) Inventors: Swen Wiethoff, Berlin (DE); Zoran Dmitrasinovic, Berlin (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 198 days.

(21) Appl. No.: 16/468,832

(22) PCT Filed: Nov. 27, 2017

(86) PCT No.: PCT/EP2017/080487
§ 371 (c)(1),
(2) Date: Jun. 12, 2019

(87) PCT Pub. No.: WO2018/108502
PCT Pub. Date: Jun. 21, 2018

(65) Prior Publication Data
US 2020/0099268 A1   Mar. 26, 2020

(30) Foreign Application Priority Data

Dec. 15, 2016 (DE) ..................... 10 2016 225 170.8

(51) Int. Cl.
| | |
|---|---|
| H02K 3/50 | (2006.01) |
| F16F 15/073 | (2006.01) |
| H02K 5/24 | (2006.01) |

(52) U.S. Cl.
CPC .............. *H02K 3/50* (2013.01); *F16F 15/073* (2013.01); *H02K 5/24* (2013.01); *H02K 2203/09* (2013.01)

(58) Field of Classification Search
CPC ........ H02K 3/50; H02K 5/24; H02K 2203/09; H02K 3/52; H02K 2203/03; H02K 3/505;
(Continued)

(56) References Cited

U.S. PATENT DOCUMENTS

| | | | |
|---|---|---|---|
| 8,674,578 B2 | 3/2014 | Aono et al. | 310/208 |
| 8,779,641 B2 | 7/2014 | Fujii et al. | 310/71 |

(Continued)

FOREIGN PATENT DOCUMENTS

| | | | | |
|---|---|---|---|---|
| CN | 101926074 A | 12/2010 | | H02K 3/50 |
| DE | 10 2015 200 089 A1 | 7/2016 | | H02K 3/38 |

(Continued)

OTHER PUBLICATIONS

Foreign Patent DE 10 2015 200 089 A1, U.S./English Equivalent US 2017/0366060 A1.
(Continued)

*Primary Examiner* — Shawki S Ismail
*Assistant Examiner* — Htet Z Kyaw
(74) *Attorney, Agent, or Firm* — Slayden Grubert Beard PLLC

(57) ABSTRACT

Various embodiments include a guide ring for connection to a housing of an electric machine comprising: a main body having a ring element; a plurality of busbars; and a plurality of pressure elements. The busbars are overmolded by the main body. Each of the plurality of pressure elements projects from an outer circumferential surface of the main body and to frictionally connect the guide ring to an inner receiving surface of the housing.

9 Claims, 5 Drawing Sheets

(58) Field of Classification Search
CPC ............ H02K 3/38; H02K 3/51; H02K 3/521;
H02K 3/522; H02K 3/524; H02K 3/525;
H02K 3/527; F16F 15/073
USPC ...................................................... 310/51, 71
See application file for complete search history.

(56) References Cited

U.S. PATENT DOCUMENTS

| | | | |
|---|---|---|---|
| 8,836,186 B2 | 9/2014 | Katou et al. ..................... 310/71 |
| 9,601,958 B2* | 3/2017 | Yamaguchi ............ H02K 3/522 |
| 10,848,042 B2* | 11/2020 | Beyerl .................... H02K 11/33 |
| 2007/0273221 A1* | 11/2007 | Kinoshita ................ H02K 5/20 |
| | | | 310/58 |
| 2010/0187924 A1* | 7/2010 | Yagai ..................... H02K 3/522 |
| | | | 310/71 |
| 2011/0001388 A1* | 1/2011 | Fujii ....................... H02K 3/522 |
| | | | 310/257 |
| 2014/0028127 A1* | 1/2014 | Chamberlin ........... H02K 5/225 |
| | | | 310/71 |
| 2014/0232215 A1* | 8/2014 | Takasaki .................. H02K 3/50 |
| | | | 310/43 |
| 2015/0188377 A1* | 7/2015 | Kim ........................ F04B 35/04 |
| | | | 310/156.38 |
| 2016/0294248 A1 | 10/2016 | Atarashi et al. ................ 310/71 |
| 2016/0365766 A1 | 12/2016 | Auge et al. ..................... 310/91 |
| 2017/0366060 A1 | 12/2017 | Haberkorn et al. |
| 2018/0013325 A1* | 1/2018 | Jakob ....................... H02K 5/15 |

FOREIGN PATENT DOCUMENTS

| | | | |
|---|---|---|---|
| DE | 10 2016 204 955 A1 | 10/2016 | ............... H02K 3/50 |
| DE | 10 2015 209 225 A1 | 11/2016 | ............... H02K 3/50 |
| EP | 1 416 614 A1 | 5/2004 | ............... H01R 39/54 |
| EP | 2 752 974 A1 | 7/2014 | ............... H02K 3/50 |
| JP | 2009-290921 A | 12/2009 | ............... H02K 29/12 |
| JP | 2010011627 A | 1/2010 | ............... H02K 15/04 |
| JP | 2010-172086 A | 8/2010 | ............... H02K 5/22 |
| WO | 2012/070752 A1 | 5/2012 | ............... H02K 15/04 |
| WO | 2018/108502 A1 | 6/2018 | ............... H02K 3/50 |

OTHER PUBLICATIONS

Foreign Patent DE 10 2016 204 955 A1, U.S./English Equivalent US 2016/0294248 A1.
German Office Action, Application No. 10 2016 225 170.8, 5 pages, dated Oct. 11, 2017.
International Search Report and Written Opinion, Application No. PCT/EP2017/080487, 13 pages, dated Feb. 2, 2018.
Foreign Patent CN 101926074 A, U.S./English Equivalent US 8779641 B2.
Chinese Office Action, Application No. 201780071677.6, 7 pages, dated Jul. 13, 2020.
European Office Action, Application No. 17804191.9, 6 pages.

* cited by examiner

GUIDE RING FOR CONNECTION TO A HOUSING OF AN ELECTRIC MACHINE

CROSS-REFERENCE TO RELATED APPLICATIONS

This application is a U.S. National Stage Application of International Application No. PCT/EP2017/080487 filed Nov. 27, 2017, which designates the United States of America, and claims priority to DE Application No. 10 2016 225 170.8 filed Dec. 15, 2016, the contents of which are hereby incorporated by reference in their entirety.

TECHNICAL FIELD

The present disclosure relates to electrical machines. Various embodiments may include guide rings for connection to a housing of an electric machine, e.g., an electric machine for a motor vehicle.

BACKGROUND

In some guide rings which accommodate busbars and are connected to a housing of an electric machine, the housing forms a fixed structure of a larger mass than the guide ring. Another practice includes connecting a guide ring of this kind to an inner end winding of the electric machine with the aid of swellable mats, wherein the busbars are placed in plastic grooves and then encapsulated. This method is thus characterized by an assembly process with subsequent encapsulation.

SUMMARY

The teachings of the present disclosure include guide rings which accommodate busbars and are attached in a vibration-damping manner to a housing of an electric machine, thus enabling breaks in the busbars to be avoided. For example, some embodiments include a guide ring (1) for connection to a housing (2) of an electric machine (3), the guide ring (1) comprising: a main body (4) having a ring element (5), a plurality of busbars (7), and a plurality of pressure elements (8, 23), wherein the busbars (7) are overmolded by the main body (4), and the pressure elements (8, 23) project from an outer circumferential surface (9) of the main body (4) and are designed to frictionally connect the guide ring (1) to an inner receiving surface (11) of the housing (2) of the electric machine (3).

In some embodiments, the pressure elements (8) each comprise a bending strap (8), which each radially surround the main body (4) in some region or regions, the bending straps (8) are secured on the outer circumferential surface (9) of the main body (4), a wedge (10) is in each case arranged between the main body (4) and each of the bending straps (8), and the wedges (10) are designed to press the bending straps (8) radially outwards, thus ensuring that the bending straps (8) are connected frictionally to the inner receiving surface (11) of the housing (2) of the electric machine (3).

In some embodiments, the bending straps (8) each form two contact surfaces (12, 13) for making contact with the inner receiving surface (11) of the housing (2) of the electric machine (3), wherein the wedges (10) are each arranged centrally between the contact surfaces (12, 13) in the circumferential direction.

In some embodiments, the wedge (10) is connected integrally to the main body (4) by means of at least one film hinge (15).

In some embodiments, at least one of the wedges (10) has a first outer toothing (16), into which a first tongue (18) of the main body (4) can latch in order to fix the wedge (10) in an axial relative position between the main body (4) and the bending strap (8).

In some embodiments, the wedge (10) additionally has a second outer toothing (17), into which a second tongue (19) of the bending strap (8) can latch in order to fix the wedge (10) in the axial relative position between the main body (4) and the bending strap (8).

In some embodiments, a holding element (20) is arranged on at least one of the bending straps (8), the holding element (20) projects radially outwards from the bending strap (8), and the holding element (20) is designed to be introduced into a corresponding recess (21) in the inner receiving surface (11) of the housing (2) of the electric machine (3), thus ensuring that the guide ring (1) and the housing (2) of the electric machine (3) are connected positively to one another.

In some embodiments, the holding element (20) is chamfered on the lower side thereof.

In some embodiments, the pressure elements (23) each comprise a spring element (23), wherein the spring elements (23) each project from the ring element (5) of the main body (4) in the radial direction, at least in some region or regions, the spring elements (23) are secured on the outer circumferential surface (9) of the main body (4), and the spring elements (23) are designed to frictionally connect the guide ring (1) to the inner receiving surface (11) of the housing (2) of the electric machine (3).

In some embodiments, the housing (2) has an inner receiving surface (11) for the connection of the guide ring (1), the inner receiving surface (11) radially surrounds the guide ring (1), and the pressure elements (8, 23) of the guide ring (1) connect the guide ring (1) frictionally to the inner receiving surface (11) of the housing (2) of the electric machine (3).

BRIEF DESCRIPTION OF THE DRAWINGS

Exemplary embodiments of the teachings herein are discussed in more detail below on the basis of the schematic drawings, in which.

DETAILED DESCRIPTION

Figure 1:
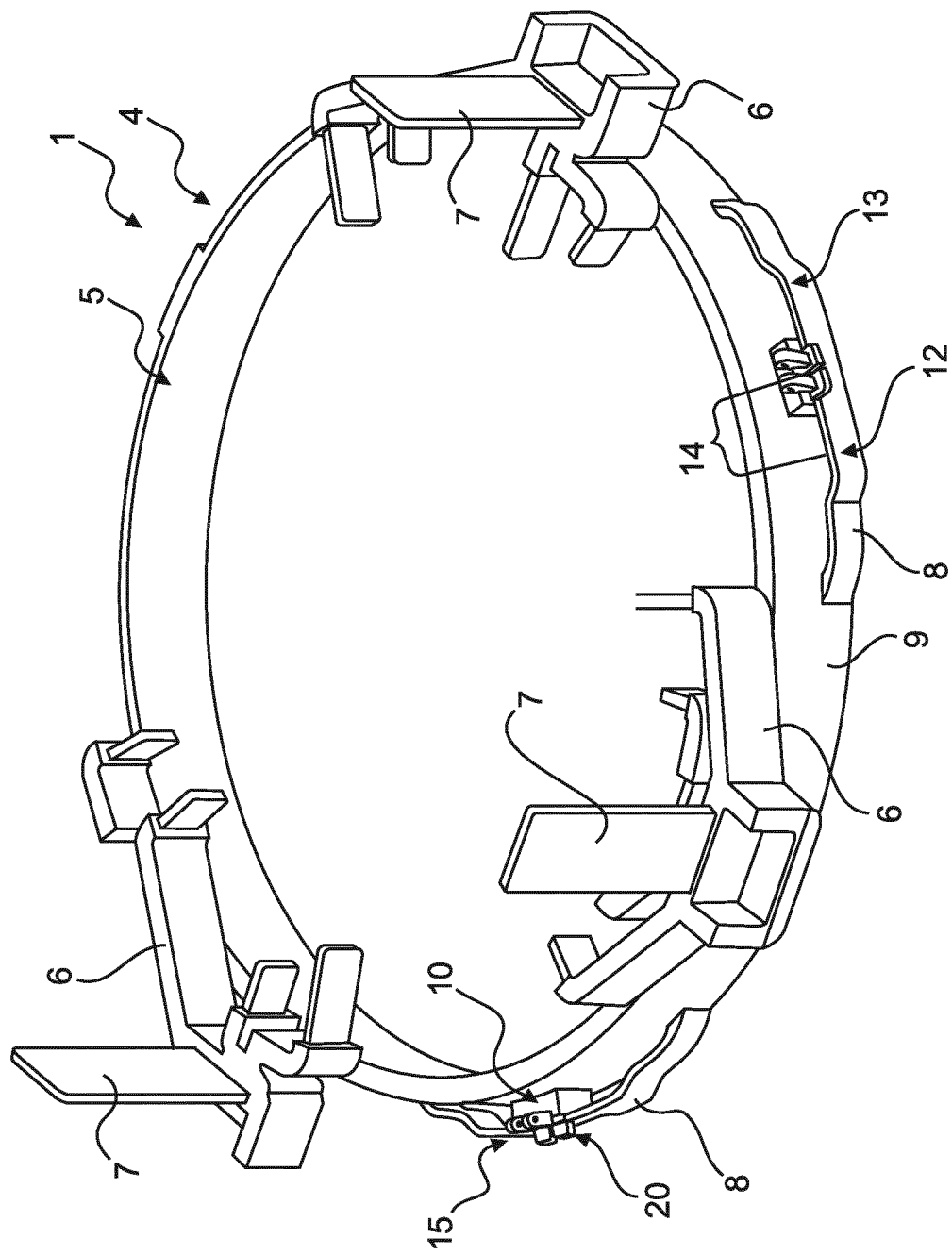
FIG. 1 shows a perspective view of an example embodiment of a guide ring incorporating teachings of the present disclosure.

In some embodiments, a guide ring for connection to a housing of an electric machine comprises a main body having a ring element, a plurality of busbars, and a plurality of pressure elements, wherein the busbars are overmolded by the main body, and wherein the pressure elements project from an outer circumferential surface of the main body and are designed to frictionally connect the guide ring to an inner receiving surface of the housing of the electric machine.

In this arrangement, the busbars are overmolded by the main body, which is composed at least substantially of plastic, wherein a corresponding overmolding process can be implemented with simple tools without additional lateral slides. In this case, an assembly process and subsequent encapsulation can be eliminated. It is thereby possible to achieve a small variety of parts. Thus, the production of the guide ring with busbars can take place in a single process step. In particular, it is possible here to eliminate tolerances which would arise from an assembly process.

Here, the radial dimensions of the inner receiving surface of the housing of the electric machine correspond to the respective radial outer dimensions of the pressure elements. In particular, the inner receiving surface of the housing can be an inner annular circumferential surface. In an assembled state, according to which the guide ring is connected frictionally to the inner circumferential surface of the housing of the electric machine, the pressure elements exert a normal force on the inner circumferential surface of the housing of the electric machine, giving rise to the frictional engagement between the guide ring and the inner circumferential surface, which prevents movement of the guide ring relative to the inner circumferential surface. By means of the frictional engagement, vibrations of the overmolded busbars are damped to such an extent that it is possible to avoid breaking of the busbars.

In some embodiments, the pressure elements each comprise a bending strap, which each radially surround the main body in some region or regions. The bending straps are each secured on the outer circumferential surface of the main body, wherein a wedge is in each case arranged between the main body and each of the bending straps, and wherein the wedges are designed to press the bending straps radially outwards, thus ensuring that the bending straps are connected frictionally to the inner receiving surface of the housing of the electric machine.

In this arrangement, two ends of the bending strap can be secured at a circumferential spacing from one another on the outer circumferential surface of the main body. As an alternative, it is also possible for the bending strap to be secured on the outer circumferential surface of the main body at only one end or by only one of its ends. In some embodiments, each of the two ends of the bending straps to be connected integrally to the guide ring by producing the guide ring together with the bending straps in a joint injection molding process. This increases the stability of the bending straps and facilitates the production process. The combination of the bending straps and wedges allows particularly firm frictional engagement between the guide ring and the housing of the motor, ensuring that vibrations of the overmolded busbars can be damped to a particularly great extent in order to avoid breakage of the busbars in a particularly reliable manner.

The bending straps can each form two contact surfaces for making contact with the inner receiving surface of the housing of the electric machine, wherein the wedges are each arranged centrally between the contact surfaces in the circumferential direction. In other words, the wedge is introduced or driven in in the center between the two contact surfaces, between the main body of the guide ring and the respective bending strap. The spacing between the wedge and the two contact surfaces gives rise to two clamping lengths, which each generate a preload (spring effect). A loss of the frictional engagement with the housing due to settling phenomena is thereby avoided.

The wedge can furthermore be connected integrally to the main body by means of at least one film hinge, e.g. by means of two identical film hinges arranged adjacent to one another in the circumferential direction. In other words, the wedge can be molded directly onto the guide ring via the film hinge(s). As a result, the wedge can be molded together with the other components of the guide ring in a single work process, which has a positive effect on the manufacturing outlay. Moreover, the wedge is already pre-installed through the connection to the main body, thereby enabling the mounting or use of the guide ring on the housing of the electric machine to be made easier and furthermore enabling loss of the wedge to be avoided.

In some embodiments, at least one of the wedges and/or each wedge has a first outer toothing, into which a first tongue of the main body, in particular the ring element thereof, can latch in order to fix the wedge in an axial relative position between the main body, in particular the ring element thereof, and the bending strap. In some embodiments, the wedge is stabilized in its intended end position and that release of the wedge (possibly by vibration) is avoided. As an alternative or in addition, at least one of the wedges, e.g. each of the wedges, can have a second outer toothing, into which a second tongue of the bending strap can latch in order to fix the wedge in the axial relative position between the main body and the bending strap.

In some embodiments, at least one holding element, e.g. a holding projection or two adjacently arranged identical holding projections, may be arranged on at least one of the bending straps, e.g. on each of the bending straps, wherein the holding element projects radially outwards from the bending strap and is designed to be introduced into a corresponding recess, in particular a groove, in the inner receiving surface of the housing of the electric machine, thus ensuring that the guide ring and the housing of the electric machine are additionally connected positively to one another, in particular in an axial direction. Thus, positive engagement, in particular axial and preferably play-free positive engagement, is formed between the guide ring and the motor housing if at least one holding element engages in the recess in the inner receiving surface of the housing of the electric machine. According to this embodiment, the guide ring is connected frictionally and positively to the motor housing, thereby enabling vibrations of the overmolded busbars to be damped to a particularly great extent, thus enabling breaking of the busbars to be avoided in a particularly reliable manner.

The holding element can be chamfered on the lower side thereof. In other words, bevels are provided underneath the at least one holding element, in particular underneath the at least one holding projection, thereby making it possible to achieve flowing radial linear contact with the recess, in particular with a housing groove, in the inner receiving surface of the housing of the electric machine. It is furthermore possible at an early stage to absorb an axial downward-directed force component during the installation of the wedge.

In some embodiments, the pressure elements each comprise a spring element, wherein the spring elements project from the ring element of the main body in the radial direction, at least in some region or regions. Furthermore, the spring elements are secured on the outer circumferential surface of the main body and are furthermore designed to frictionally connect the guide ring to the inner receiving surface of the housing of the electric machine.

In an assembled state, according to which the guide ring is connected frictionally to the inner receiving surface of the housing of the electric machine, the spring elements exert a normal force on the inner receiving surface of the housing of the electric machine, giving rise to the frictional engagement between the guide ring and the inner receiving surface, which prevents movement of the guide ring relative to the inner receiving surface. By means of the frictional engagement, vibrations of the overmolded busbars are damped to such an extent that it is possible to avoid breaking of the busbars.

In some embodiments, an electric machine includes a housing and a guide ring as described above. The electric machine can be an asynchronous motor or a synchronous motor for a vehicle, for example, in particular a motor for driving said vehicle (by way of assistance or alone). The housing of the electric machine has an inner receiving surface for the connection of the guide ring, wherein the inner receiving surface radially surrounds the guide ring, and the pressure elements of the guide ring connect the guide ring frictionally to the inner receiving surface of the housing of the electric machine. As regards effects, advantages and embodiments of the electric machine, attention is drawn to the above statements in connection with the guide ring in order to avoid repetition.

Figure 2:
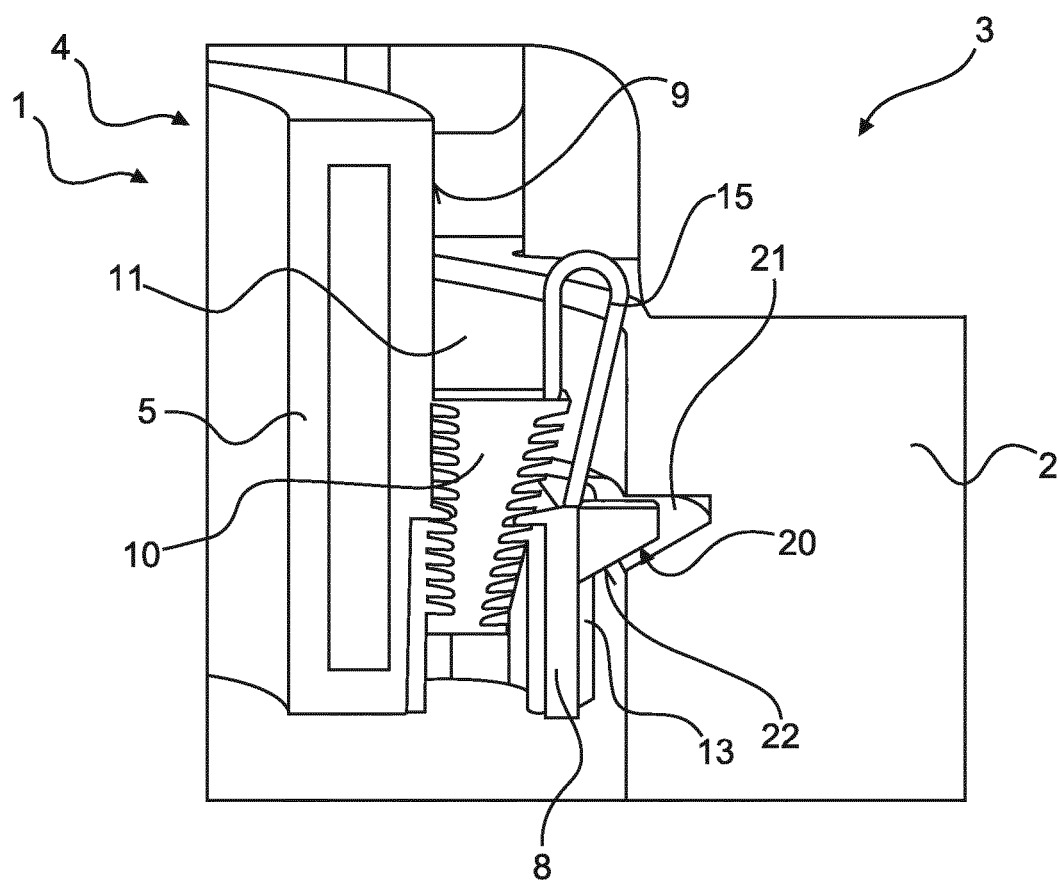
FIG. 2 shows a perspective view of part of the guide ring shown in FIG. 1, wherein the guide ring is connected to a housing of an electric machine, part of which is shown.
Figure 3:
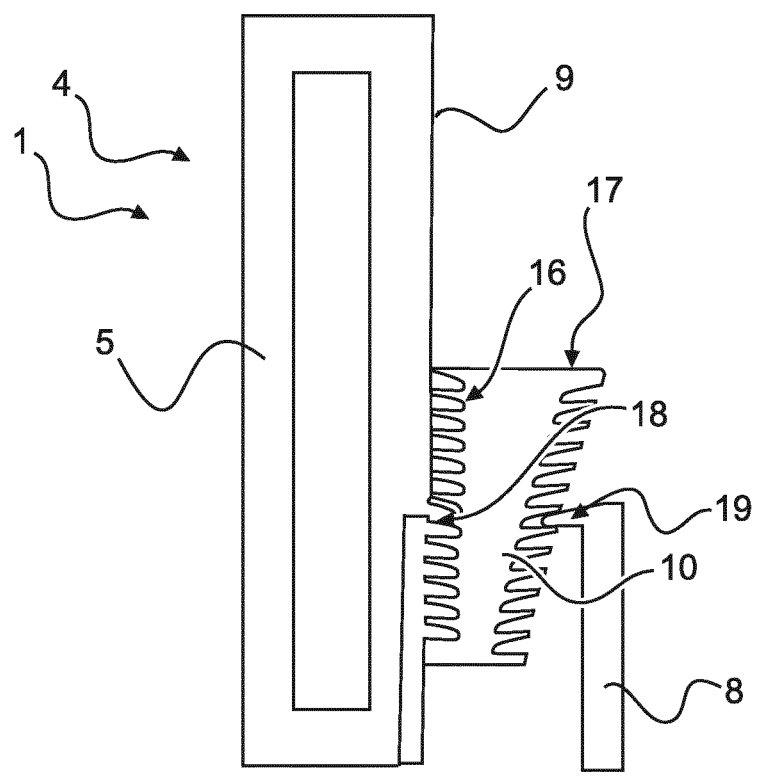
FIG. 3 shows a longitudinal section through part of the guide ring shown in FIG. 1.

FIGS. 1 to 3 show a guide ring 1 which is illustrated individually on its own in FIG. 1 and is connected to a housing 2 of an electric machine 3 in FIG. 2. The guide ring 1 comprises a main body 4 having a ring element 5 and having a plurality of holding elements 6, within which respective busbars 7 are accommodated. In the illustrative embodiment shown, all the elements of the main body 4 are connected integrally to one another, wherein the main body 4 has been produced integrally in an injection molding process.

The guide ring 1 or the ring element 5 thereof has a total of three identical pressure elements in the form of bending straps 8, of which two bending straps 8 are visible in FIG. 1. The third bending strap is situated on the outer rear side of the ring element 5, which is not visible in FIG. 1. The three bending straps are arranged with a spacing relative to one another in the circumferential direction of the ring element 5. In the illustrative embodiment shown, in each case two ends of the bending straps 8 are secured at a circumferential spacing from one another on an outer circumferential surface 9 of the ring element 5.

In the illustrative embodiment shown, each of the two ends of the bending straps 8 is connected integrally to the ring element 5. The bending straps 8 extend in the radial direction, in each case at a distance from the outer circumferential surface 9 of the ring element 5, wherein the bending straps 8 are arranged further out in the radial direction than the ring element 5 of the main body 4. In other words, the individual bending straps 8 each surround the ring element 5 of the main body 4 in the radial direction in some region or regions.

Between the bending straps 8 and the ring element 5, this gives rise in each case to a gap, within each of which a wedge 10 is arranged, wherein the wedge surfaces of the wedge 10 touch the corresponding bending strap 8 and the ring element 5, respectively. The wedges 10 can be driven between the ring element 5 and the bending straps 8 in such a way that the bending straps 8 are pressed radially outwards. In this way—as shown by FIG. 2—the bending straps 8 can be connected frictionally or non-positively to the housing 2 of the electric machine 3, wherein the bending straps 8 exert on an inner lateral surface 11 of the housing 2 of the electric machine 3 a normal force which prevents the guide ring 1 being able to move in an axial direction relative to the inner lateral surface 11 of the housing 2 of the electric machine 3. In this way, it is possible to damp vibrations of the overmolded busbars 7 in such a way that breaking of the busbars 7 can be reliably avoided.

In the illustrative embodiment shown in FIGS. 1 to 3, the bending straps 8 each form a first contact surface 12 and a second contact surface 13. The contact surfaces 12, 13 are each arranged furthest out in the radial direction and touch the inner lateral surface 11 of the housing 2 of the electric machine 3 (cf. FIG. 2). In contrast, the remaining regions, which are situated further in in the radial direction, do not touch the inner lateral surface 11 of the housing 2 of the electric machine 3. In this arrangement, the wedges 10 are each arranged centrally between the two contact surfaces 12, 13 in the circumferential direction. This equal spacing between the respective wedge 10 and the two contact surfaces 12, 13 gives rise to two equal clamping lengths 14, which each generate a preload (spring effect), thereby enabling loss of the frictional engagement with the housing 2 due to settling phenomena to be avoided. The wedges 10 are each connected integrally to one of the bending straps 8 by means of two identical film hinges 15 arranged adjacent to one another in the circumferential direction, wherein the film hinges 15 are molded onto the respective bending strap 8.

Each of the wedges 10 furthermore has a first outer toothing 16 and a second outer toothing 17. The outer toothings 16, 17 are each arranged on the wedge surfaces of the wedges 10. In this arrangement, the first outer toothing 16 faces the ring element 5 and the second outer toothing 17 in each case faces the corresponding bending strap 8. The ring element 5 forms a respective first tongue 18 for each wedge 10, and the bending straps 8 each form a second tongue 19. The first tongues 18 and the second tongues 19 are arranged at the same level in the axial direction, wherein the first tongues 18 project in the radial direction from the ring element 5, and the second tongues 19 project in the radial direction from the respective bending strap 8. Thus, in the radial direction, one of the first tongues 18 is oriented in the direction of one of the second tongues 19 and vice versa, in each case at the same axial level. Here, a cross section of the first outer toothing 16 corresponds in each case to a cross section of the relevant first tongue 18 and a cross section of the respective second outer toothing 17 corresponds in each case to a cross section of the relevant second tongue 19.

As can be seen particularly clearly from FIGS. 2 and 3, the first and second tongues 18, 19 engage in the first outer toothing 16 and in the second outer toothing 17, respectively, thus fixing the wedges 10 in their respective envisaged axial relative position between the ring element 5 and the relevant bending strap 8. This ensures that the wedges 10 are stabilized in their intended end position and that release of the wedges 10 (possibly by vibration) can be avoided. Purely for reasons of greater clarity, FIG. 3 does not show, in particular, a film hinge 15, a contact surface 12, 13 and a holding projection 20 (described below), although these elements are part of the guide ring 1.

Arranged on each of the bending straps 8 there are furthermore in each case two holding elements in the form of holding projections arranged adjacent to one another in the circumferential direction in the region of the film hinges 15, wherein the respective holding projections 20 project radially outwards from the relevant bending strap 8 and can be introduced into a corresponding groove 21 in the inner receiving surface 11 of the housing 2 of the electric machine 3 (FIG. 2), thus ensuring that the guide ring 1 and the housing 2 of the electric machine 3 are connected to one another positively without play in the axial direction. Thus, the guide ring 1 and the housing 2 of the electric machine 3 are connected to one another both frictionally or non-positively and positively, thereby enabling vibrations of the overmolded busbars 7 to be damped to a particularly great extent, thus enabling breaking of the busbars 7 to be avoided in a particularly reliable manner.

As can be seen from FIG. 2, the holding projections 20 are chamfered on the lower side thereof, or chamfers 22 are provided underneath the holding projections 20, thereby making it possible to achieve flowing radial linear contact with the groove 21 in the inner lateral surface 11 of the housing 2 of the electric machine 3 and to absorb at an early stage an axial downward-directed force component during the installation of the wedges 10.

Figure 4:
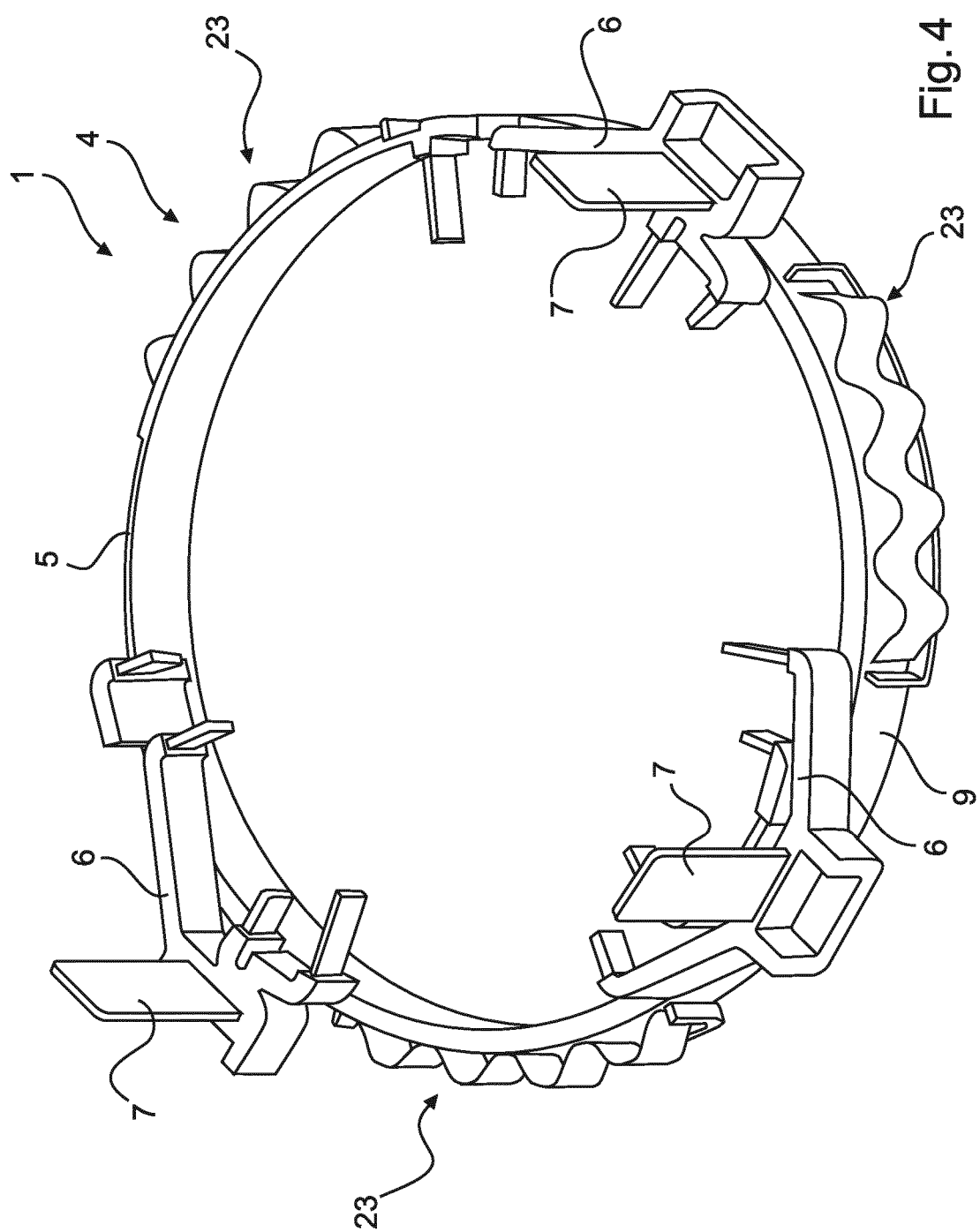
FIG. 4 shows a perspective view of another example embodiment of a guide ring incorporating teachings of the present disclosure.
Figure 5:
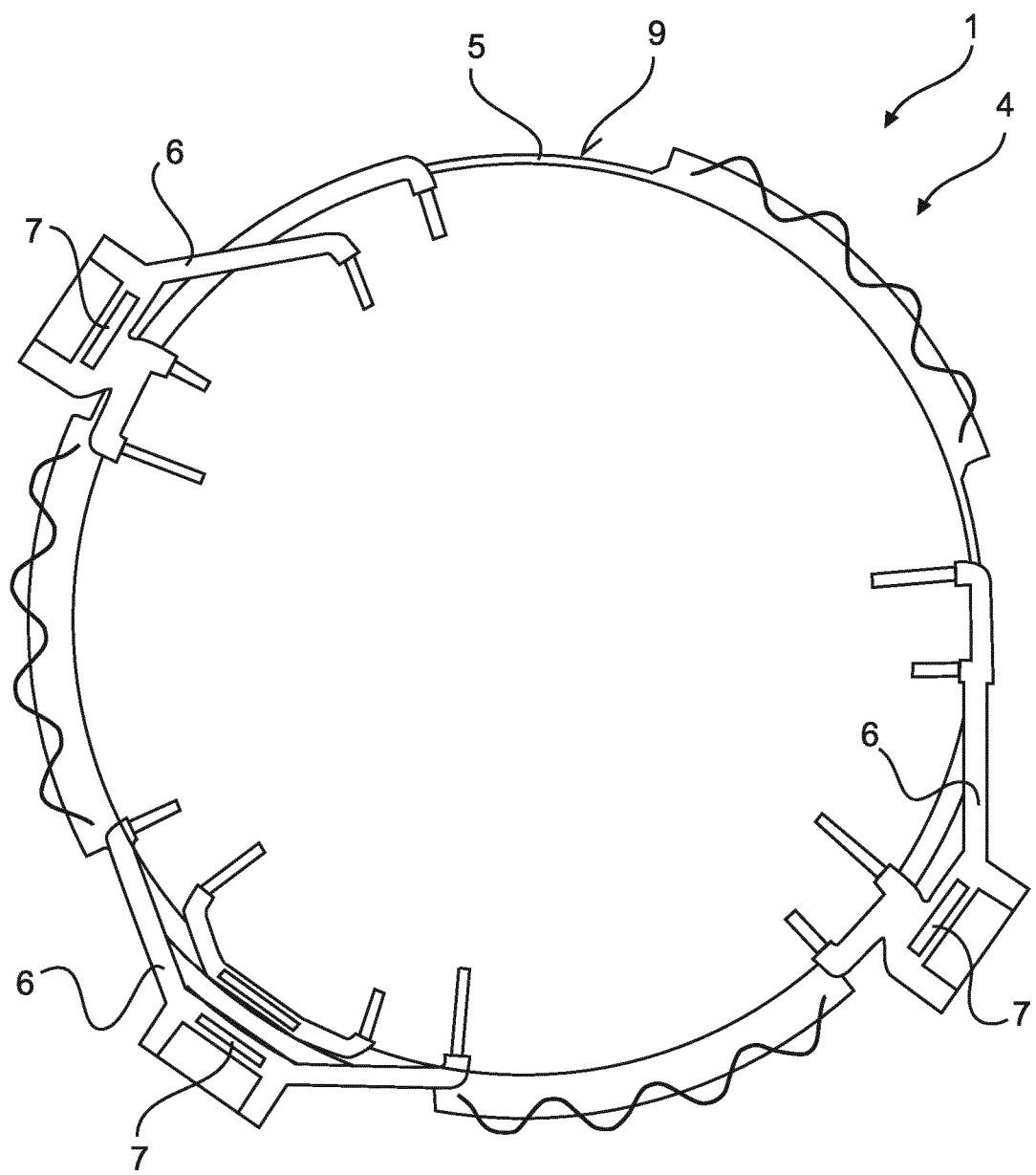
FIG. 5 shows a plan view of the guide ring shown in FIG. 4.

FIGS. 4 and 5 show another illustrative embodiment of a guide ring 1 incorporating the teachings herein. The guide ring 1 comprises a main body 4 having a ring element 5 and having a plurality of holding elements 6, within which respective busbars 7 are accommodated. In the illustrative embodiment shown, all the elements of the main body 4 are connected integrally to one another, wherein the main body 4 has been produced integrally in an injection molding process.

The guide ring shown in FIGS. 4 and 5 differs from the embodiment shown by FIGS. 1 to 3, in particular in as much as, instead of the bending straps 8 and the wedges 10 for frictional connection to an inner receiving surface 11 of a housing 2 of an electric machine 3 (in a manner similar to that shown by FIG. 2), three pressure elements in the form of spring elements are provided, in the embodiment shown three corrugated spring elements 23 arranged spaced apart in the circumferential direction.

The corrugated spring elements 23 each project from the ring element 5 of the main body 4 in the radial direction in some region or regions. In this case, the corrugated spring elements 23 are secured on the outer circumferential surface 9 of the ring element 5 of the main body 4, wherein the ring element 5 has the same outside diameter in each case in corresponding securing regions. The corrugated spring elements 23 can produce a sufficiently hard spring contact (normal force) with the inner lateral surface 11 of the housing 2 of the electric machine 3, thus giving rise to frictional engagement or non-positive engagement between the guide ring 1 and the housing 2 of the electric machine 3. The frictional engagement prevents the guide ring 1 moving in the axial direction relative to the inner receiving surface 11. By means of the frictional engagement, vibrations of the overmolded busbars 7 can thus be damped to such an extent that it is possible to avoid breaking of the busbars 7.

What is claimed is:

1. A guide ring for connection to a housing of an electric machine, the guide ring comprising:
    a main body having a ring element;
    a plurality of busbars; and
    a plurality of pressure elements;
    wherein the busbars are overmolded by the main body;
    each of the plurality of pressure elements projects from an outer circumferential surface of the main body and to frictionally connect the guide ring to an inner receiving surface of the housing;
    each of the plurality of pressure elements comprises a bending strap;
    the bending straps radially surround the main body in at least one region;
    the bending straps are secured on the outer circumferential surface of the main body;
    a respective wedge is arranged between the main body and each of the bending straps;
    the wedges press the bending straps radially outwards to increase a frictional force on the bending straps against the inner receiving surface of the housing.

2. The guide ring as claimed in claim 1, wherein:
    each bending strap forms two contact surfaces for contact with the inner receiving surface of the housing; and
    the respective wedges are arranged centrally between the contact surfaces in the circumferential direction.

3. The guide ring as claimed in claim 1, wherein each wedge is connected integrally to the main body with a film hinge.

4. The guide ring as claimed in claim 1, wherein at least one of the wedges has a first outer toothing, into which a first tongue of the main body can latch to fix the wedge in an axial relative position between the main body and the respective bending strap.

5. The guide ring as claimed in claim 4, wherein the at least one wedge comprises a second outer toothing, into which a second tongue of the bending strap can latch in order to fix the wedge in the axial relative position between the main body and the respective bending strap.

6. The guide ring as claimed in claim 1, further comprising a holding element on at least one of the bending straps;
    wherein the holding element projects radially outwards from the bending strap; and
    the holding element is configured to be introduced into a corresponding recess in the inner receiving surface of the housing, thus ensuring that the guide ring and the housing of the electric machine are connected positively to one another.

7. The guide ring as claimed in claim 6, wherein the holding element is chamfered on the lower side thereof.

8. A guide ring for connection to a housing of an electric machine, the guide ring comprising:
    a main body having a ring element;
    a plurality of busbars; and
    a plurality of pressure elements;
    wherein the busbars are overmolded by the main body;
    each of the plurality of pressure elements projects from an outer circumferential surface of the main body and to frictionally connect the guide ring to an inner receiving surface of the housing;
    the pressure elements each comprise a respective spring element;
    the spring elements each project from the ring element of the main body in the radial direction;
    the spring elements are secured on the outer circumferential surface of the main body; and
    the spring elements frictionally connect the guide ring to the inner receiving surface of the housing.

9. An electric machine comprising:
    a housing with an inner receiving surface;
    a guide ring including a main body with a ring element;
    a plurality of busbars; and
    a plurality of pressure elements;
    wherein the busbars are overmolded by the main body;
    each of the plurality of pressure elements projects from an outer circumferential surface of the main body and to frictionally connect the guide ring to the inner receiving surface of the housing;
    the inner receiving surface radially surrounds the guide ring; and
    the pressure elements frictionally connect the guide ring to the inner receiving surface;
    each of the plurality of pressure elements comprises a bending strap;

the bending straps radially surround the main body in at least one region;

the bending straps are secured on the outer circumferential surface of the main body;

a respective wedge is arranged between the main body and each of the bending straps;

the wedges press the bending straps radially outwards to increase a frictional force on the bending straps against the inner receiving surface of the housing.

\* \* \* \* \*